Nov. 19, 1935.  T. TRIPOLITIS  2,021,340
BUTTER CUTTING AND DISPENSING DEVICE
Filed Oct. 14, 1931    4 Sheets-Sheet 3

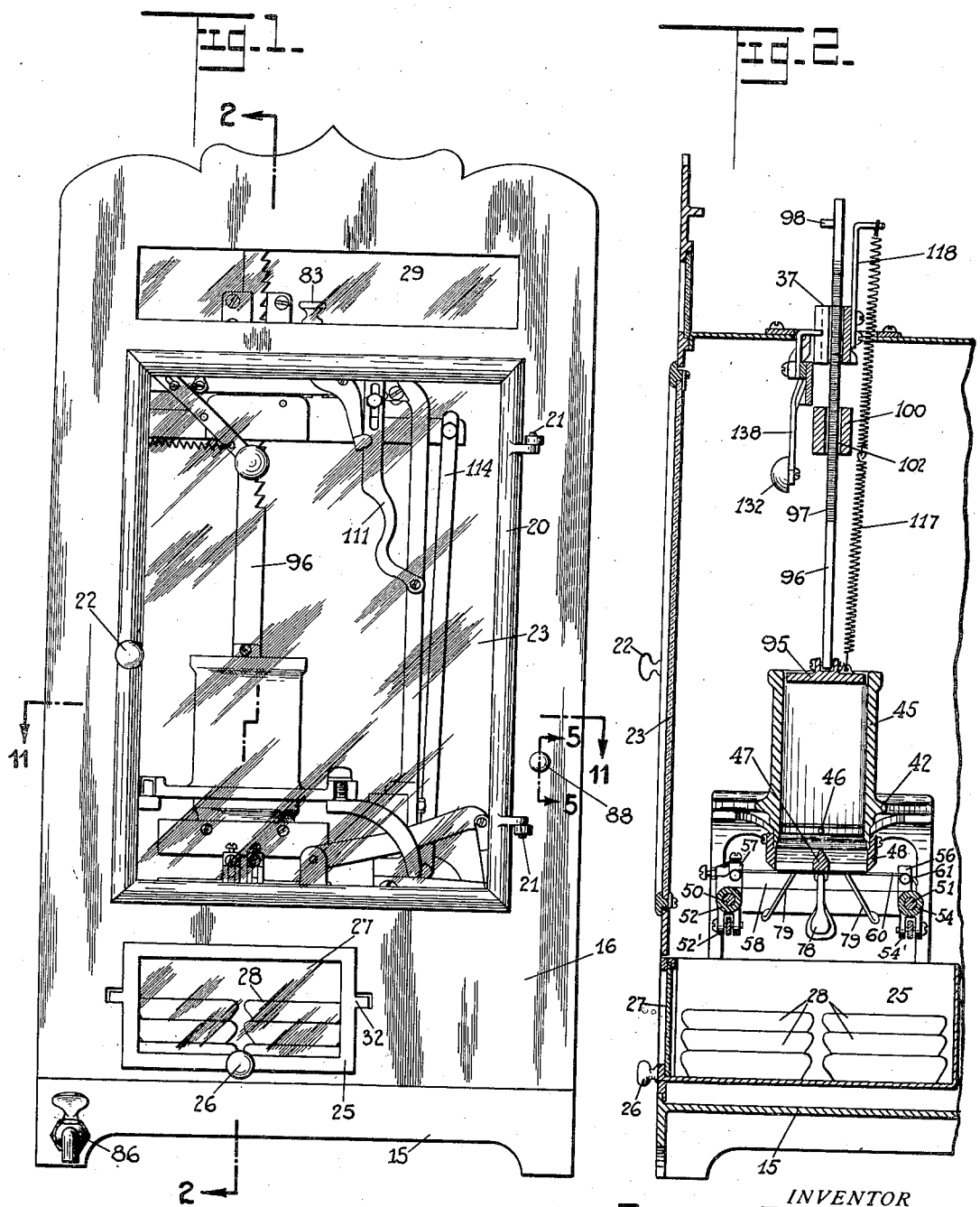

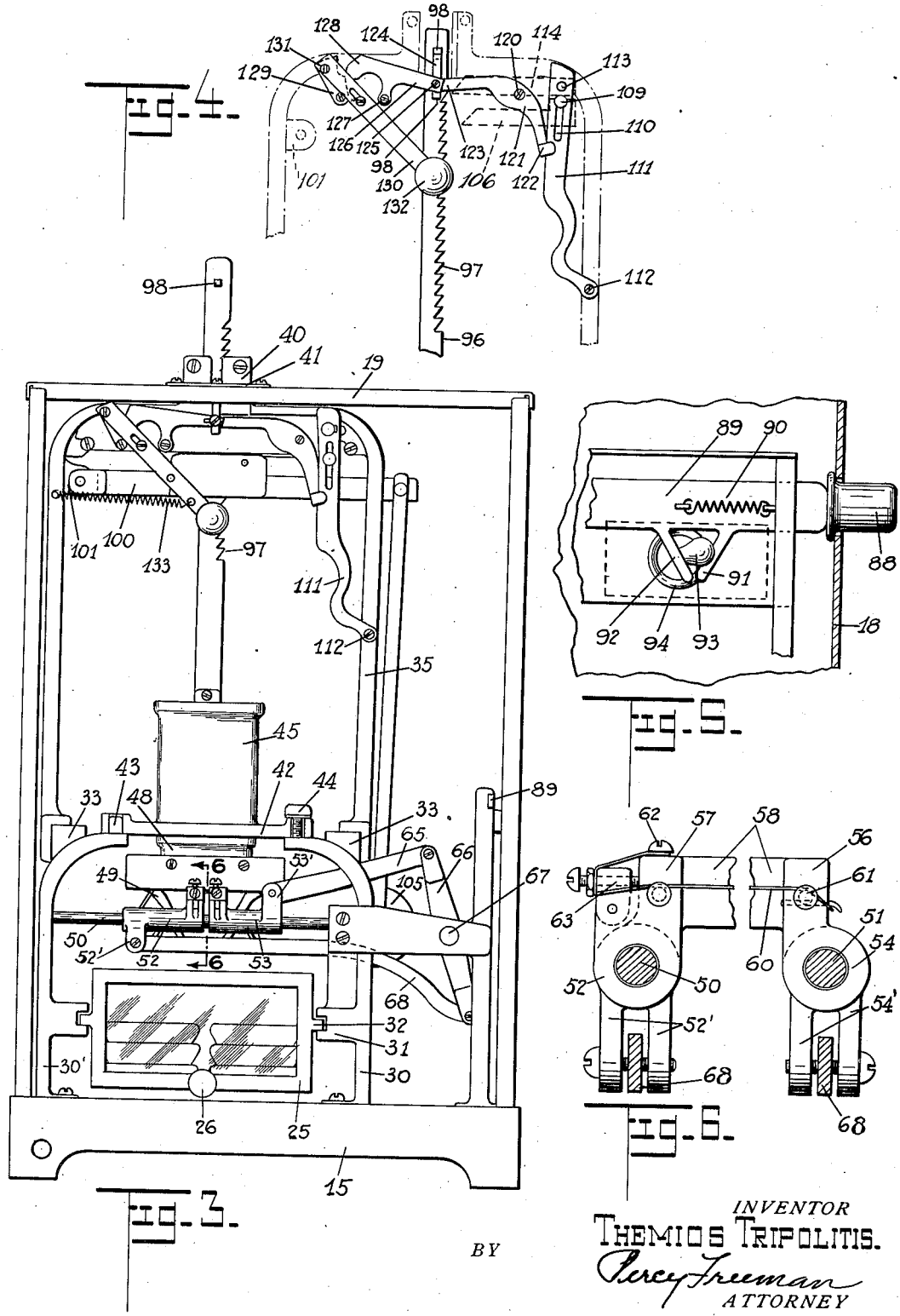

INVENTOR
THEMIOS TRIPOLITIS.
BY Percy Freeman
ATTORNEY

Nov. 19, 1935.  T. TRIPOLITIS  2,021,340
BUTTER CUTTING AND DISPENSING DEVICE
Filed Oct. 14, 1931  4 Sheets-Sheet 4
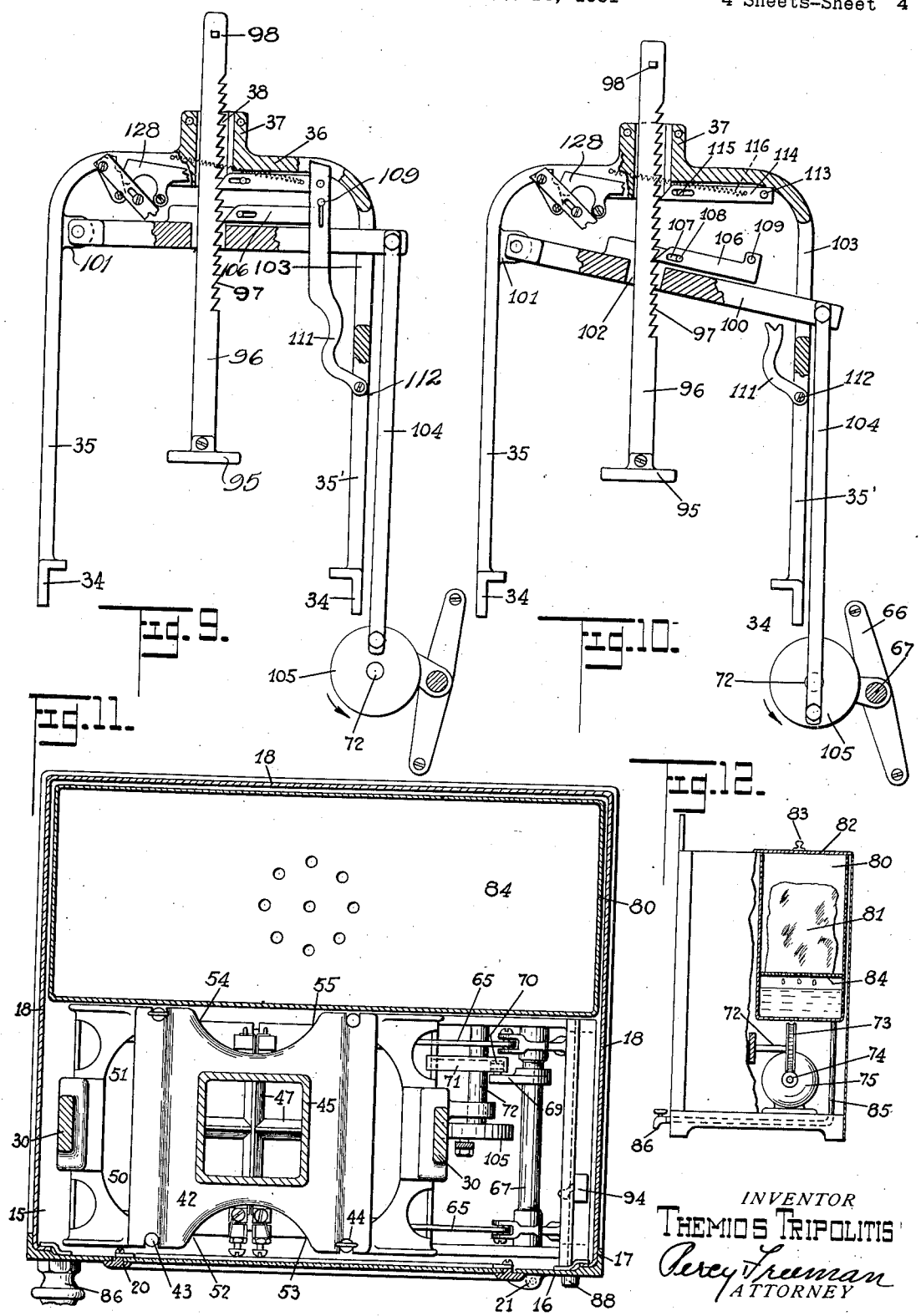
INVENTOR
THEMIOS TRIPOLITIS
Percy Freeman
ATTORNEY Patented Nov. 19, 1935

2,021,340

UNITED STATES PATENT OFFICE 2,021,340

BUTTER CUTTING AND DISPENSING DEVICE

Themios Tripolitis, New York, N. Y.

Application October 14, 1931, Serial No. 568,785

18 Claims. (Cl. 31—21)

This invention relates to butter cutting apparatus, and more particularly to mechanisms for severing butter in rectangular block form into slices suitable for table service.

This apparatus is designed primarily for the use of hotels, restaurants and like establishments where a large quantity of small pieces of butter are required.

One of the objects of this invention is to provide a cabinet having a number of compartments for the storing of a refrigerant, as a block of ice, another compartment for the motor used in actuating the mechanism, a third compartment for containing the butter sliced ready to serve, and a main compartment, accessible for the exterior, in which is deposited the mass of butter to be cut and the slicing mechanism therefor.

It is also an object of this invention to provide a butter cutting machine having butter feeding mechanisms adapted to automatically advance a brick of butter through the field of operation of stationary cutters and then through the field of operation of movable cutters whereby a plurality of pieces of butter of a selected thickness are adapted to be simultaneously cut from the end of the brick of butter and automatically distributed and deposited in butter plates.

It is a further object of this invention to provide a butter cutting and dispensing machine which is electrically controlled and adapted to feed a brick of butter into engagement with stationary and movable cutters to cause a plurality of pieces of butter of a predetermined thickness to be simultaneously discharged and distributed simultaneously into a plurality of butter plates with but a single piece of butter being deposited in each plate.

It is furthermore an object of this invention to provide an improved butter cutting and dispensing machine wherein a quantity of butter is adapted to be automatically fed through a hopper a predetermined distance through the field of stationary cutters and then into the field of operation of movable cutters which act to cut off pieces of butter of a predetermined thickness to be automatically distributed into adjacently positioned butter plates carried in a removable container or tray positioned beneath the cutting mechanisms.

A further feature is in the provision of means for starting and stopping the slicing mechanism in accordance with the demands for the sliced pieces, none of which need come in contact with the human hand.

Another aim is to produce a device of attractive appearance, well calculated to be seen by the guests when in operation, as an advertisement an assurance of orderly cleanliness.

These and other like objects, such as the provision of an effective drainage means, inexpensiveness in operation, accessibility of the finished product, and general convenience, are accomplished by the novel design, construction and combination of parts hereinafter described and shown in the accompanying drawings forming a material part of this disclosure, and in which:

Fig. 1 is a front elevational view of a butter cutting cabinet as made in accordance with the invention.

Fig. 2 is a vertical sectional view taken on line 2—2 of Fig. 1.

Fig. 3 is a front elevational view of the mechanism within the cabinet, the plunger elements being shown in a raised position.

Fig. 4 is a fragmentary view of the same but showing the plunger in a lowered position.

Fig. 5 is an enlarged sectional view of the switch actuating device as taken on line 5—5 of Fig. 1.

Fig. 6 is an enlarged transverse sectional view taken on line 6—6 of Fig. 3.

Fig. 9 is a partial vertical sectional view showing the operating means when the plunger is at rest.

Fig. 10 is another view of the same parts but showing the manner of forcing plunger downwardly.

Fig. 11 is a transverse sectional view taken on line 11—11 of Fig. 1.

Fig. 12 is a fragmentary side elevational view of the cabinet drawn to a reduced scale, its side wall broken away to show the disposition of parts.

Figures 7, 13:
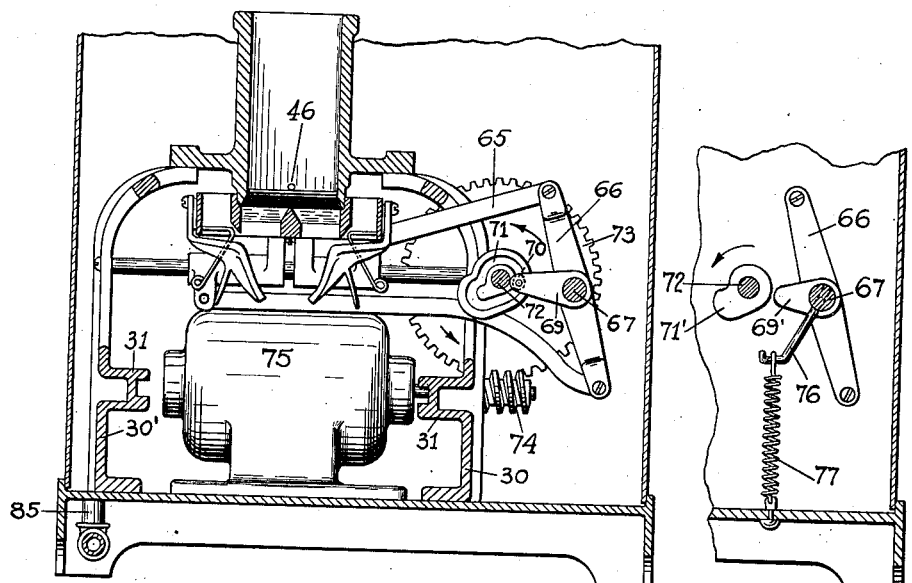
Fig. 7 is a vertical sectional view of the motor drive as applied to the cutting device, the parts of which are shown in position after the slicing operation has taken place.
Fig. 13 is fragmentary sectional view, similar to Figs. 7 and 8, but showing a modified form of lever control.
Figure 8:
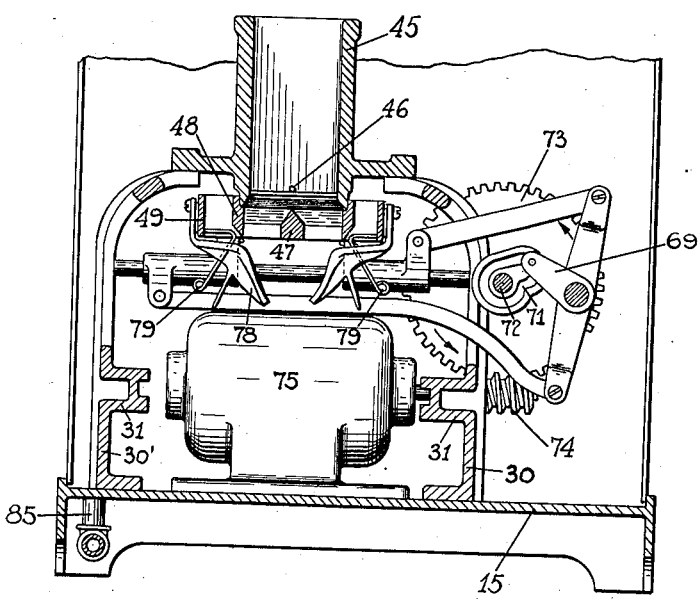
Fig. 8 is a similar view of the same, but showing the parts in an open position, as prior to operation.

The apparatus consists of a rectangular base 15 having down-turned flanged edges which are lengthened to constitute feet at its four corners, a front plate 16, which is secured to the base and which may be ornamentally formed at its upper edge, as indicated in Fig. 1, and provided at its side edges with rearwardly turned flanges 17 to which are rigidly connected the walls 18 of a casing provided at its top with a cover plate 19.

Midway between the side edges of the front plate 16 is an opening to receive the frame 20 of a door having hinges 21 and provided with an operating knob 22, the frame being furnished with a transparent panel 23.

Another opening in the front plate 16, below and to one side of the door, is arranged to slidingly receive a drawer 25 provided with an actuating knob 26 and having a transparent panel 27 through which can be seen a series of removable plates 28 carried by the drawer; above the main door is another transparent plate 29 set in the front plate 16, through which parts of the operating mechanism can be seen.

Mounted on the base 15 are two opposed brackets 30—30' having inreaching lugs 31 grooved to receive supports 32 formed on the sides of the drawer 25 and also having integral with their upper, arcuately inturned ends, a pair of blocks 33 to receive the lower ends 34 of an upper frame composed of two upright elements 35—35' connected by a cross piece 36 provided at its center with an upstanding hub 37 in which is formed a vertical slot 38.

The hub 37 projects upwardly through the cover plate 19 and is provided with plates 40 overlying the slot 38 and having outstanding flanges 41 secured to the upper surface of the cover-plate 19.

Mounted on the upper elements of the brackets 30—30' is a platform 42 having slots in two of its diametrically opposite corners engaging pins 43 extending upward from the brackets 30—30', the other corners to the platform being securely held by clamp screws 44.

Disposed vertically on the center of the platform 42 is an open rectangular receptacle 45 in which an elongated block of butter is disposed lengthwise, the same normally resting on cross wires 46 dividing the lower end of the receptacle or hopper into four square openings. Below the wires are the convergent angles of the arms of a cross shaped primary separator 47, rigidly carried in a frame 48 secured to the lower downreaching portion of the receptacle 45, and partially encircling the frame 48 is a spaced frame 49.

Set in the brackets 30, to extend therebetween, in a plane below the separator 47, are a pair of bars 50—51 spaced in parallel, the front bar 50 having mounted on it a pair of opposed sleevelike slides 52—53 relatively left and right, a corresponding pair 54—55 being mounted on the rear bar 51.

The left hand slides 52—54 have downwardly extending forked lugs 52'—54' at their outer ends, while the right hand slides 53—55 though constructed similarly to the left hand slides have their forked lugs extending upwardly, as seen at 53' in Fig. 3.

As seen in Figs. 2 and 6, the left end slides 52—54 are rigidly connected by means of raised lugs 56 at their inner adjacent ends, similar lugs 57 extending between the right hand pair 53—55, these lugs being connected by cross bars 58.

Rigidly attached to the lugs 56, on their proximate sides are cutting wires 60 trained over studs 61 and eventually clamped by screws 62 set in the lugs 57, the bight of the wires 60 being looped over a tensioning device, 63 carried by the front lugs 57.

Thus it will be seen that the wires 60 may approach each other very closely when the slides are moved into their closest position and move widely apart when in their retracted position.

Pivotedly mounted in the lugs 53'—55' are links 65 pivoted at their outer ends in the upper ends of levers 66 fixed on a rock shaft 67 centrally of its length, the shaft being mounted in the framework of the machine, while in the other arms of the levers 66 are other links 68 connecting with the downreaching lugs 52'—54'.

Operatively engaged with the rock shaft 67 is an arm 69 carrying at its outer end a roll 70 engaged in the groove of a face cam 71 mounted on a shaft 72 on which is also fixed a worm gear 73, the same being in mesh with the worm 74 on the end of a shaft projecting from the motor 75.

As shown in Fig. 13, the rock shaft 67 may be provided with an arm 69' disposed in the path of a profile cam 71' fixed on the shaft 72 and held operatively thereagainst by a rod 76 drawn by a spring 77.

In either case it will be seen that reciprocative motion will be transmitted to the slides, causing the movable cutting wires 60 to advance from the center, shearing off the four split portions of the butter mass and thence moving inwardly to permit the butter to be pressed downwardly for another slicing operation.

These thin slices of butter are directed by a series of guides or secondary separators 78 and spring fingers 79, so that the butter slices will fall into the plates 28 on the sliding drawer 25. Supported on two opposite walls of the frame 49 are the secondary separators 78 which project downwardly beneath the frame 49 and are positioned directly below one of the primary separators 47.

Also mounted on the two opposite side members of the frame 49, are the wire stop members or spring fingers 79, two of which are provided on each side of the frame on opposite sides of the secondary separators 78. These spring fingers or guides 79 are inclined downwardly as clearly shown in Fig. 2, and not only assist the separators 78 in properly guiding the pieces of butter into the respective plates 28 but also act as stop members for the cut slices or squares of butter when the lower end of the brick of butter is being cut transversely by means of the movable cutting wires 60. The pieces of butter being cut are prevented from moving outwardly away from the advancing cutters 60 by means of the spring fingers 79. After a cutting operation by the movable cutters the pieces of butter of a predetermined thickness, as they drop, come into contact with the inclined sides of the separators 78 for properly directing the respective pieces of butter into the respective plates 28.

Rearwardly of the described mechanism, and above the motor 75 is a compartment 80 to receive a block of ice 81, see Fig. 12, this compartment having a removable cover 82, provided with a knob 83 for convenience in removing the cover, the ice resting on a perforated plate 84 through which melted ice passes to be carried out by a drain pipe 85, the water outlet being controlled by a cock 86 at the front of the apparatus.

The motor is controlled by a push button 88 extending through the front of the cabinet and actuating a slide 89 held normally outward by a tension spring 90 and having a pair of arms 91—92 arranged diagonally to operate between them the stem 93 of an enclosed switch 94, see Fig. 5.

The butter mass is pressed downwardly to be severed by the fixed cutting wires 46 and separated by the cross primary separators 47 in the following manner.

A plunger 95 is fitted to slide freely in the receptacle 45 and is provided with a rectangular stem 96 having a series of rack teeth 97 on one of its edges, while at a point near the top is set a rigid pin 98.

The plunger stem 96 is guided in a rectangular opening formed in the hub 37 on the cross member 36 of the frame. A lever 100 is pivoted to a lug 101 extending inwardly from the frame member 35 and is provided with an elongated aperture 102 through which the stem 96 freely moves.

The free end of the lever 100 extends through a slot 103 in the opposite frame member 35' and has pivotedly engaged with its extending end a link 104, which in turn, is pivoted to a crank disc 105 fixed on the motor driven shaft 72.

Carried by the upper side of the lever arm 100 is a spring drawn pawl 106, its forward, bevelled end engaging the teeth 97 of the plunger stem to move the plunger downward within the upper receptacle as the crank 105 is rotated.

The pawl 106 is provided with a slot 107 in its forward end in which is received a pin 108 set in the lever, the pawl also carrying at its raised rear portion another pin 109 engaged in the slot 110 of a substantially vertical lever 111, pivoted at 112 to the frame side 35', and pivoted above the slot 110, as at 113, is another pawl 114 guided by a pin 115 set in the frame and drawn forwardly by the coiled tension spring 116.

The pawl 114 obviously acts normally as a detent to prevent raising of the plunger stem, due to this engagement with the teeth 97. Attached to the plunger 95 is a coiled tension spring 117, its upper end being fixed to an arm 118 raised above the guiding hub 37.

Pivoted at 120 to the frame is a curved lever 121 having a part 122 normally in contact with the lever 111 and capable of pressing the same outwardly together with the pawl 114, when the opposite inner end 123 of the lever is depressed.

A block 124 on the inner end 123 of the lever receives a pin 125, set in a lever 126, pivoted at 127 to the frame, the pin passing through the inner end 123 of the lever 121; a projection 128 of the lever 126 is arranged to make contact with the lug 129 operated by a lever 130 pivoted to the frame at 131 and provided at its free end with the weight 132.

It may now be seen that when the plunger has reached its lowermost position the pin 98 will engage upper end of the block 124, moving the lever element 122, outwardly retracting the detent pawl 114 and allowing the spring 117 to operate, raising the plunger high above the receptacle.

On the upper movement of the plunger, it will make contact with the weight 132, moving the lug 129 upwardly to engage the outer end of the lever 126, resetting the previously described pawl mechanism for further operation, the weight 132 being normally retracted by a tension spring 133.

It is to be noted that the motor may be started whenever a demand occurs for the butter slices, that the same are maintained in a chilled condition within the cabinet, and that the butter is fed intermittently into position for the cross cutting wires, all motions being performed in timed relation.

The method of operation is believed to be so evident from the foregoing description as to require no further explanation.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described the invention, what is claimed as new and desired to secure by Letters Patent, is:

1. In a butter cutting apparatus, a cabinet having a refrigerating compartment, a receptacle to split the butter longitudinally into four sections, co-operative cross wires movable toward and from each other below said receptacle, means for actuating said cross wires reciprocatively in opposed relation, a plunger to press the butter downwardly in said receptacle, means for actuating said plunger so as to move through definite distances or spaces in succession, a motor for operating said plunger and said cross wires, and means in said cabinet to limit the motion of said plunger.

2. In a butter cutting apparatus, a pair of horizontal bars disposed in parallel, pairs of sleeves respectively front and rear slidable toward and from each other on said bars, cutting wires carried upon the proximate upper surfaces of the opposed sleeves, means for tensioning said wires, and means for actuating said sleeves in timed relation.

3. In a butter cutting apparatus, a cabinet having a receptacle to receive an oblong print of butter, means adapted to divide the butter into longitudinal sections, means to feed the butter against the dividing means intermittently by uniform successive movements, means for severing the end portion of each section transversely during the periods of inaction of said feeding means, a series of trays into which the severed portions are delivered one on each tray, and means to remove said trays as a unit from said cabinet.

4. In a butter cutting apparatus, a cabinet having a receptacle to receive a prismatic print of butter, means fixed in said receptacle to divide the butter lengthwise the prism into four sections, a plunger having a step-by-step feed to force the butter through said receptacle, opposed cross wires to cut the sections into slices of uniform thickness, and means for moving said cross wires towards and from each other in timed relation to the movement of said plunger.

5. In a butter cutting apparatus, a cabinet having a receptacle to receive an oblong print of butter, means fixed in said receptacle to divide the butter lengthwise the print into four sections, a plunger operable in said receptacle, said plunger having a stem provided with ratchet teeth, pawl and detent means engaging said teeth to feed the plunger intermittently by uniform successive movements, means to disengage said feeding means at the lower limit of the plunger stroke, an opposed pair of cross-cutting wires to shear the extended ends of the butter sections, and means to move said wires reciprocatively in unison and in timed relation to said plunger movement.

6. In a butter cutting apparatus, a cabinet having a receptacle to receive an oblong print of butter, means fixed in the receptacle to divide the butter lengthwise the print into a plurality of sections, a plunger operable in said receptacle, said plunger having a stem provided with ratchet teeth, pawl and detent means engaging said teeth to feed the plunger intermittently by uniform successive movements, a crank actuated lever to operate said pawl, means to detach said pawl and detent from the teeth of said plunger stem when at the lower limit of its travel, a shaft on which said crank is fixed, a cam on said shaft, a pair of opposed wires moved reciprocatively by said cam to sever slices from the butter sections, a motor to drive said shaft, and control means on said cabinet for said motor.

7. In a butter cutting apparatus, a cabinet having a receptacle to receive an oblong print of butter, means fixed in the receptacle to sever the butter into longitudinal sections, a plunger operable in said receptacle, said plunger having a stem provided with ratchet teeth, pawl and detent means engaging said teeth to feed the plunger intermittently by uniform successive movements, a crank actuated lever to operate said pawl, means to detach said pawl and detent from the teeth of said plunger stem when at the lower limit of its travel, resilient means to raise said plunger when released from said pawl and detent, means for resetting the pawl and detent in engagement with the teeth on the plunger stem when raised to its limit, a motor driven shaft in said cabinet on which said lever actuating crank is fixed, a cam on said shaft, and means actuated by said cam to shear off uniform slices of the butter sections during intermissions of plunger movements.

8. In a butter cutting apparatus, a cabinet having an arcuate frame fixed in its lower portion, a second frame attached to the first frame, a butter receptacle having a broad base removably engaged on the first frame, said receptacle being accessible at the front of the cabinet, mechanism carried by the upper frame for feeding the butter downwardly in said receptacle progressively, means in the receptacle for dividing the butter into sections as it is pressed downwardly, a pair of bars relatively front and rear extending in spaced parallel relation between the sides of the first named frame, opposed pairs of slides on said bars, wires extending between the right and left hand pairs of slides, lever actuated links to move said wires towards and from each other to slice the butter sections, and motor driven means to actuate said levers simultaneously with the pressure means and in timed relation thereto.

9. A butter cutting and dispensing machine comprising a hopper adapted to carry a brick of butter, crossed stationary cutters in said hopper, feed means for automatically feeding the brick of butter downwardly in said hopper past said crossed cutters a predetermined distance to cut the brick of butter into a plurality of bars, means for separating said bars, movable cutters, mechanisms for actuating said movable cutters at a predetermined time to cause the movable cutters to cut transversely through said bars to cut off a plurality of pieces of butter of equal thickness, resilient stop members for holding the pieces of butter in proper position while being cut, and secondary separators for guiding the respective pieces of butter into butter receiving plates positioned beneath the hopper.

10. A butter cutting and dispensing machine comprising a hopper adapted to carry a brick of butter, primary cutters within said hopper, means for automatically feeding the brick of butter into engagement with said primary cutters to cut the same into a plurality of bars, primary separators for separating said bars of butter, resilient stop members against which said bars of butter are adapted to be engaged, secondary cutters, means for actuating the same at a predetermined time to cut pieces of butter from said bars of equal thickness permitting said pieces of butter to drop by gravity, and secondary separators for guiding the dropping pieces of butter into a plurality of adjacently positioned butter plates placed beneath said hopper.

11. A butter cutting and dispensing machine comprising a hopper adapted to carry a brick of butter, means for feeding said brick of butter through said hopper predetermined distances, means for cutting said advancing brick of butter longitudinally into bars, means for cutting said bars transversely into pieces of butter of equal thickness, separators for directing the cut pieces of butter into butter plates positioned beneath said hopper, latch means for holding the feed means in a predetermined position against retraction, means for releasing said latch means, and means for automatically returning the released feed means back into normal position.

12. A butter cutting and dispensing machine comprising a hopper adapted to carry a brick of butter, feed mechanisms for advancing the brick of butter a predetermined distance through said hopper, cutters for cutting the brick of butter longitudinally and transversely to cut a plurality of pieces of butter of equal thickness from said brick, separators for separating the cut pieces of butter as they are permitted to drop by gravity into plates placed beneath said hopper, means for advancing the feed mechanisms a predetermined distance, latch means for holding the feed mechanisms against retraction, release means for retracting said latch means at the completion of the downward movement of said feed mechanisms, and means for automatically returning the released feed mechanism into normal starting position.

13. A butter cutting and dispensing machine comprising a hopper adapted to carry a brick of butter, a feed mechanism, means for operating the same a predetermined distance, cutters in said hopper adapted to act consecutively to cut the brick of butter longitudinally and then transversely to cut off a plurality of pieces of butter of predetermined thickness, separators for directing said pieces of butter into a group of adjacently positioned plates placed beneath said hopper, a spring for returning the feed mechanism to normal position, latch means for holding the feed mechanism against retraction by said spring, and means for releasing said latch means at the completion of the feeding of the brick of butter through said hopper to permit said spring to automatically return said feed mechanism to normal position.

14. In a butter cutting and dispensing machine of the class described the combination with a hopper adapted to carry a brick of butter, means for feeding the brick of butter through said hopper predetermined distances, stationary cutters in said hopper for cutting the brick of butter longitudinally into bars, primary separators for said bars of butter, a plurality of movable cutters beneath said separators, means for separating said movable cutters to cause the same to cut transversely through said bars to cut off pieces of butter of equal thickness, means for returning said movable cutters back to normal position after a cutting operation, and secondary separators for separating the cut pieces of butter as they drop by gravity after a cutting operation.

15. In a butter cutting machine of the class described the combination with a hopper adapted to carry a brick of butter, stationary cutters in said hopper, feed means for advancing a brick of butter into engagement with said stationary cutters to cut the brick of butter into a plurality of bars, primary separators for said bars, movable cutters, means for operating the same at a predetermined time to cut said bars transversely to cut off a plurality of pieces of butter of equal thickness, secondary separators for conducting the cut pieces of butter into butter plates placed beneath said hopper, operating means connected with said feed means, means for returning said movable cutters back to normal position after a cutting operation, a latch mechanism for said feed means, and means operated by the feed means at the completion of the feeding of the brick of butter through said hopper to automatically cause release of said latch mechanism to permit the return of said feed means to normal position, and a restoration of said latch mechanism into latching engagement with said feed means.

16. In a device of the class described, including a hopper adapted to carry material to be fed therethrough, a pair of movable cutter wires initially positioned normal to the vertical axis of the mass of material, and means for moving the said cutters away from each other through the material.

17. In a butter cutting machine of the class described the combination with a hopper adapted to carry a brick of butter, movable cutters beneath said hopper, means for cutting the brick of butter into a plurality of bars, a pair of links and a rocker arm for operating said movable cutters and a cam for actuating said rocker arm, driving means for actuating the cam and control means for governing the operation of said driving means.

18. In a butter cutting apparatus, a cabinet having a receptacle to receive an oblong print of butter, controllable means for progressively advancing the butter through the receptacle definite distances, cross wires to cut the butter into four substantially equal sections as advanced, a pair of horizontal bars disposed in parallel below the cross wires, pairs of sleeves respectively at the front and rear of the apparatus, slidable toward and away from each other on said bars, cutting wires carried upon the proximate upper surfaces of the opposed sleeves to shear slices from the advanced ends of the butter sections, said last named wires being operable in timed relation to said feeding means, and a motor within said cabinet to actuate the feeding means and cross wires.

THEMIOS TRIPOLITIS.